(12) United States Patent
Banks

(10) Patent No.: US 10,274,003 B2
(45) Date of Patent: Apr. 30, 2019

(54) LOCK WASHER

(71) Applicant: Bendix Spicer Foundation Brake LLC, Elyria, OH (US)

(72) Inventor: Daniel E. Banks, Climax, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 116 days.

(21) Appl. No.: 15/422,595

(22) Filed: Feb. 2, 2017

(65) Prior Publication Data

US 2017/0146049 A1  May 25, 2017

Related U.S. Application Data

(62) Division of application No. 14/186,702, filed on Feb. 21, 2014, now Pat. No. 9,599,142.

(51) Int. Cl.
*B21D 39/00* (2006.01)
*F16B 39/10* (2006.01)

(52) U.S. Cl.
CPC ............ *F16B 39/108* (2013.01); *B21D 39/00* (2013.01); *F16B 39/10* (2013.01); *F16B 39/101* (2013.01); *Y10T 29/49947* (2015.01)

(58) Field of Classification Search
CPC ...... F16B 39/108; F16B 39/10; F16B 39/101; Y10T 29/49947; B21D 39/00
See application file for complete search history.

(56) References Cited

U.S. PATENT DOCUMENTS

| | | | |
|---|---|---|---|
| 424,836 A | 4/1890 | Thompson | |
| 609,084 A | 8/1898 | Cullen | |
| 679,137 A | 7/1901 | Baxter | |
| 722,649 A | 3/1903 | Bartley | |
| 732,649 A | 6/1903 | Mitchell | |
| 830,595 A | 9/1906 | Jones | |
| 843,840 A | 2/1907 | Ogden | |
| 971,637 A | 10/1910 | Rankin | |
| 1,008,084 A | 11/1911 | Smith | |
| 1,125,545 A | 1/1915 | Jackson | |
| 1,228,679 A * | 6/1917 | Jones | F16B 39/108 411/123 |
| 1,374,054 A | 4/1921 | Bridge | |
| 1,427,797 A | 9/1922 | Farrell | |
| 2,128,429 A | 8/1938 | Olson | |
| 2,151,919 A | 3/1939 | Jacobson | |
| 2,152,776 A | 4/1939 | Strid | |
| 3,623,761 A | 11/1971 | Nadherny | |
| 4,938,644 A | 7/1990 | Runels | |

* cited by examiner

*Primary Examiner* — Jermie E Cozart

(74) *Attorney, Agent, or Firm* — Reising Ethington P.C.

(57) ABSTRACT

A lock washer for releasably locking a fastener to an object is provided. The washer includes a body defining a bore configured for alignment with a bore disposed in the object. The bores are configured to receive a shank of the fastener and are disposed about a center axis along which the fastener extends. The washer further includes one or more fingers each having a first end coupled to the body and a second end configured to selectively engage a flat on either a head of the fastener or a nut. The finger is movable between a disengaged position wherein the second end of the finger is configured for disengagement from the flat and an engaged position wherein the second end of the finger is configured for engagement with the flat. The finger is biased towards the engaged position.

11 Claims, 5 Drawing Sheets

LOCK WASHER

This application is a divisional of U.S. patent application Ser. No. 14/186,702 filed Feb. 21, 2014, the entire disclosure of which is incorporated herein by reference.

BACKGROUND OF THE INVENTION a. Field of the Invention

This invention relates to fastener assemblies. In particular, the invention relates to a lock washer for releasably locking a fastener to an object and a method for releasably locking a fastener to an object.

b. Background Art

Over time, fasteners used in many applications can become loose due to vibration, temperature changes, the failure to properly torque the fastener and other factors. The use of multiple fasteners can provide some measure of safety relative to the loosening of any one fastener. Oftentimes, however, an application does not permit the use of multiple fasteners. As a result, a variety of mechanisms have been developed to limit or prevent loosening of fasteners. For example, a cotter pin is often used to secure the position of a fastener relative to a castle nut or similar structure. The use of cotter pins, however, requires specialized fastener components (e.g., cross-drilled holes in bolts) and is labor intensive thereby adding significant costs and delays in assembly. Various flat, split and formed lock washers have also been developed that are designed to apply a force against a bolt head or nut which is overcome as the fastener is torqued down. These lock washers apply a constant force against the fastener that is relatively low to enable the fastener to be torqued down and may therefore be insufficient to prevent loosening of the fastener in certain applications. U.S. Pat. No. 4,938,644 discloses a locking assembly including a specially formed collar that is disposed about the shank of a hex head fastener. The collar is biased against the head of the fastener by a spring and may be disengaged from the head by applying a force to extensions on either side of the collar to overcome the force of the spring. The locking assembly has several drawbacks, however, including the need for multiple components and modifications to the fastener.

The inventor herein has recognized a need for a lock washer for releasably locking a fastener to an object and a method for releasably locking a fastener to an object that will minimize and/or eliminate one or more of the above-identified deficiencies.

BRIEF SUMMARY OF THE INVENTION

The present invention relates to fastener assemblies. In particular, the invention relates to a lock washer for releasably locking a fastener to an object and a method for releasably locking a fastener to an object.

A lock washer for releasably locking a fastener to an object in accordance with one embodiment of the present invention includes a body defining a first bore configured for alignment with a second bore disposed in the object. The first and second bores are configured to receive a shank of the fastener and are disposed about a center axis along which the fastener extends. The lock washer further includes a finger having a first end coupled to the body and a second end configured to selectively engage an axially extending flat on a member of the fastener disposed about the shank of the fastener. The finger is movable between a disengaged position wherein the second end of the finger is configured for disengagement from the flat and an engaged position wherein the second end of the finger is configured for engagement with the flat. The first finger is biased towards the engaged position.

A method for releasably locking a fastener to an object in accordance with one embodiment of the invention includes the step of providing a lock washer. The lock washer includes a body defining a first bore configured for alignment with a second bore disposed in the object. The first and second bores are configured to receive a shank of the fastener and are disposed about a center axis along which the fastener extends. The lock washer further includes a finger having a first end coupled to the body and a second end configured to selectively engage an axially extending flat on a member of the fastener disposed about the shank of the fastener. The finger is movable between a disengaged position wherein the second end of the finger is configured for disengagement from the flat and an engaged position wherein the second end of the finger is configured for engagement with the flat and the finger is biased towards the engaged position. The method further includes the step of inserting the shank of the fastener through the first bore and into the second bore and applying a force to the finger to move the finger to the disengaged position. The method further includes the steps of rotating at least one of the shank of the fastener and the member of the fastener until a predetermined torque is obtained, aligning the flat with the second end of the finger and removing the force to allow the finger to move to the engaged position and the second end of the finger to engage the flat.

A lock washer for releasably locking a fastener to an object and a method for releasably locking a fastener to an object in accordance with the present invention represent an improvement relative to conventional devices and methods intended to preventing fasteners from loosening. The inventive lock washer does not require any structural changes to the fastener. The lock washer also does not require multiple components and is relatively easy to install. Finally, the lock washer can be disengaged from the fastener to allow the fastener to be rotated without an opposing force thereby allowing the washer to exert a greater force on the fastener when engaged than in conventional devices.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
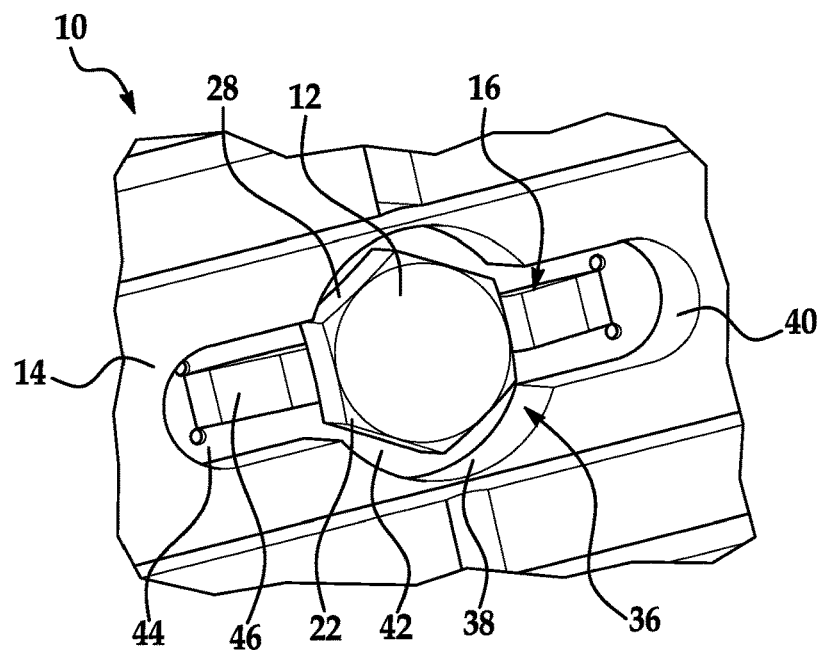
FIG. 1 is a plan view of an assembly incorporating a lock washer for releasably locking a fastener to a component of the assembly in accordance with one embodiment of the present invention.
Figure 2:
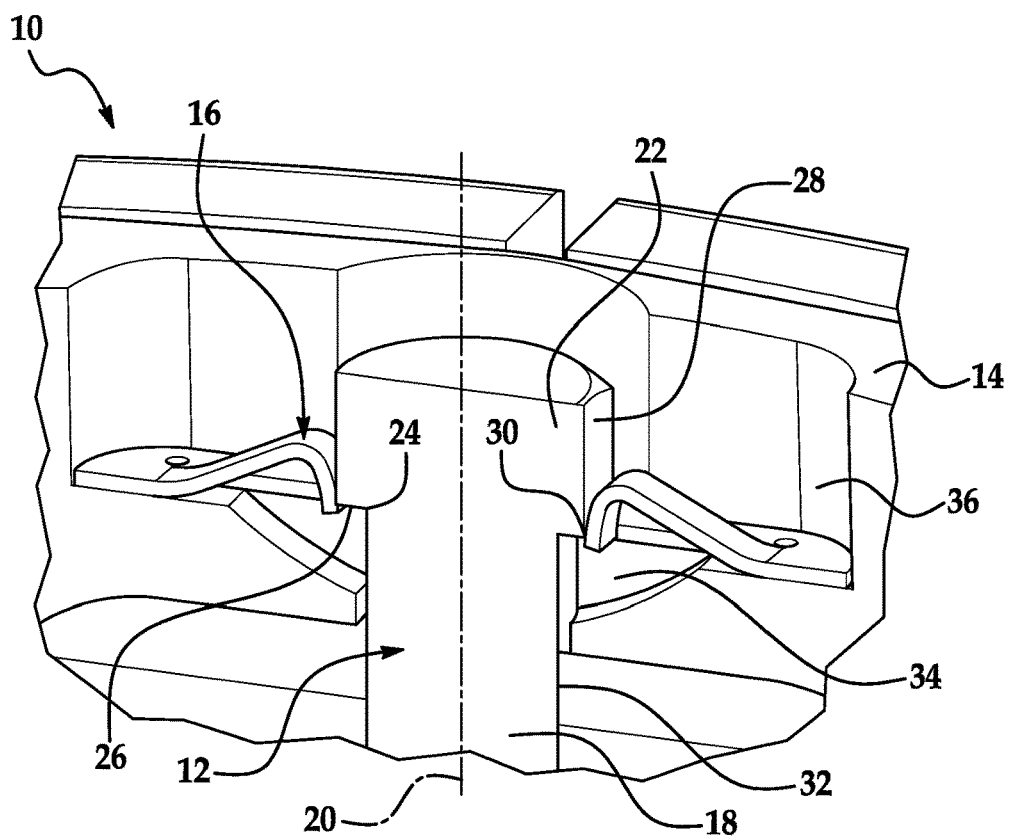
FIG. 2 is a cross-sectional view of the assembly of FIG. 1.
Figure 3:
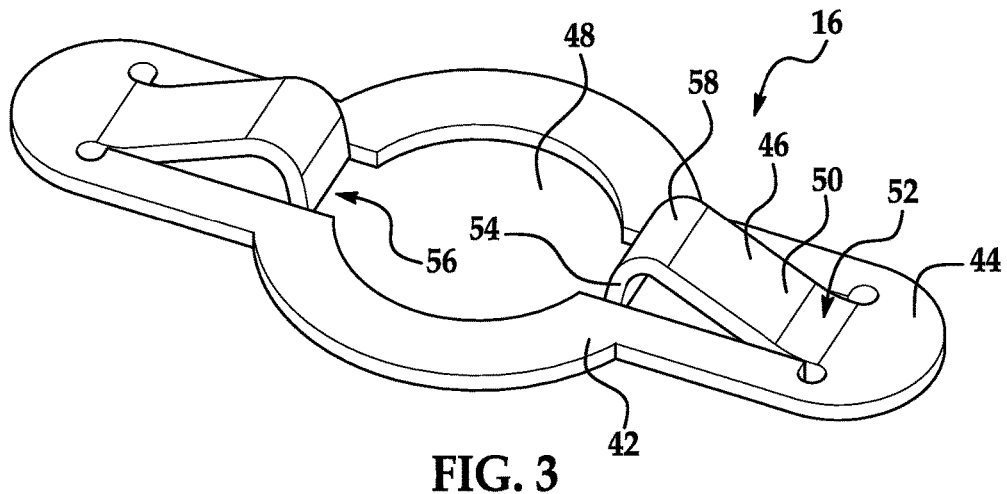
FIG. 3 is a perspective view of a lock washer in accordance with one embodiment of the present invention.
Figure 4:
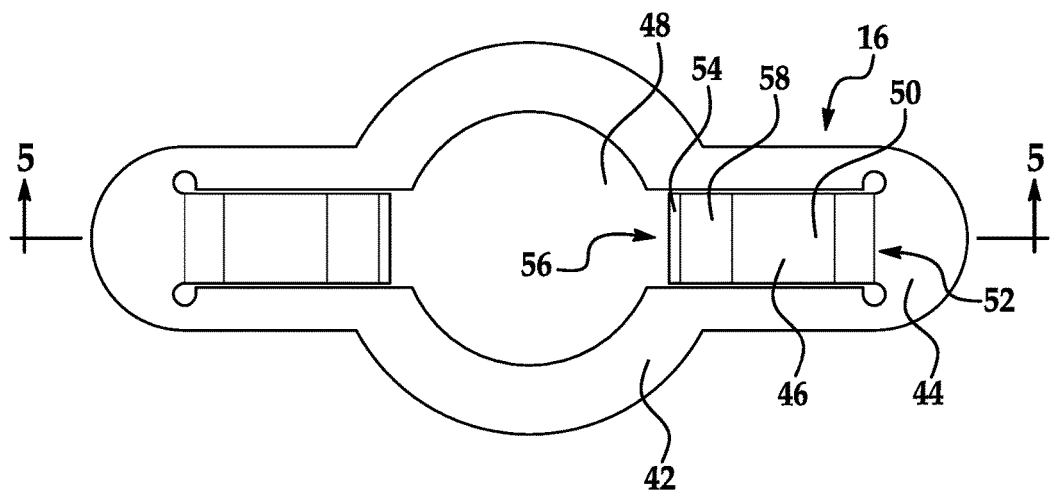
FIG. 4 is a top plan view of the lock washer of FIG. 3.
Figure 5:
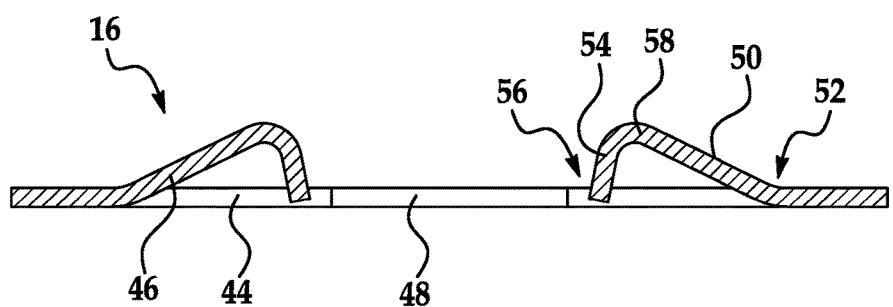
FIG. 5 is a cross-sectional view of the lock washer of FIGS. 3-4 taken along lines 5-5 in FIG. 4.
Figure 6:
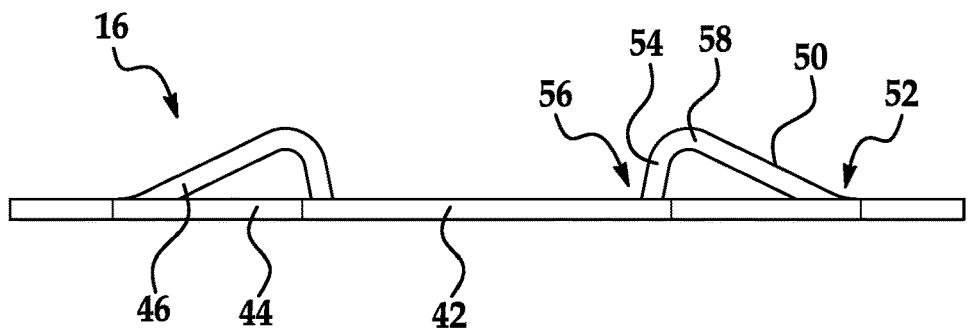
FIG. 6 is a side plan view of the lock washer of FIGS. 3-4.

Referring now to the drawings wherein like reference numerals are used to identify identical components in the various views, FIGS. 1-2 illustrate a portion of an assembly 10 in which a fastener 12 is releasably locked to an object 14 within assembly 10 using a lock washer 16 in accordance with one embodiment of the present invention. Assembly 10 is particularly adapted for use in the outer radial area of an air disc brake rotor assembly for heavy vehicles or commercial vehicles. It should be understood, however, that assembly 10 may be used on a wide variety of vehicles and in non-vehicular applications. Further, although the use of lock washer 16 is illustrated in connection with an assembly 10, it should be understood that lock washer 16 can be used in a wide variety of applications in which a fastener, such as fastener 12, is used to couple an object, such as object 14, in order to prevent the fastener from loosening relative to the object. Lock washer 16 is especially helpful in applications where vibration or thermal stress would tend to loosen fastener 12 in the absence of lock washer 16.

Fastener 12 is provided to fasten one or more components (not shown) to object 14. Fastener 12 may comprise a bolt, screw, pin or similar fastener. Fastener 12 includes a shank 18 that may include a plurality of threads configured to engage a corresponding plurality of threads in object 14 and/or a component fastened to object 14. Shank 18 extends longitudinally along a central axis 20. Fastener 12 may also include a member disposed about shank 18 such as a head 22 disposed at one end of shank 18 or a nut (not shown) disposed about shank 18 at or proximate the end of shank 18. The outer diameter of the head 22 or nut is greater than the outer diameter of shank 18 and therefore forms a radially inner shoulder 24 between a bottom surface 26 of head 22 and shank 18. Head 22 (or the nut) may define a plurality of axially extending flats 28 disposed on a radially outer surface of head 22 that form radially outer shoulders 30 with surface 26 of head 22. As used herein, when it is said that an object is axially extending or extends in an axial direction, it is meant that a longitudinal dimension of the object extends further in an axial direction than in a radial direction. Similarly, when it is said that an object is radially extending or extends in a radial direction, it is meant that a longitudinal dimension of the objects extends further in a radial direction than in an axial direction. Head 22 may form a conventional hex head defining six flats 28 equally spaced circumferentially about head 22. It should be understood, however, that the number of flats 28 may vary.

Object 14 defines a through bore 32 centered about axis 20 and configured to receive fastener 12. Bore 32 may define a plurality of threads (not shown) configured to engage threads on shank 18 of fastener 12. Object 14 may further define a countersink 34 proximate one end of bore 32 that enlarges bore 32 and is disposed about, and may be centered about, axis 20 for a purpose described hereinbelow. Object 14 may further define a counterbore 36 proximate the same end of bore 32 that enlarges bore 32 and is disposed about, and may be centered about, axis 20. Counterbore 36 may be configured to receive washer 16 and head 22 of fastener 12 and may have a depth such that washer 16 and head 22 of fastener 12 are disposed below an outer surface of object 14. Counterbore 36 may be shaped complementary to washer 16 and may define a round center section 38 configured to receive head 22 of fastener 12 and a pair of slots 40 extending radially from section 38 for a purpose discussed hereinbelow.

Washer 16 is provided to releaseably lock fastener 12 to object 14 in order to prevent fastener 12 from loosening. Washer 16 may be made from various metals and metal alloys including stainless steel or may be made from plastics depending on the application. Washer 16 may be hardened through heat treatment or other conventional methods to both withstand loads encountered during torqueing of fastener 12 and/or a nut coupled to fastener 12 and to prevent a spring element built into the washer and described hereinbelow from yielding. Washer 16 may comprise a unitary (one-piece) structure. Referring to FIGS. 3-6, washer 16 may have an elongated profile and be relatively flat and may define a body 42, one or more arms 44 and one or more fingers 46.

Body 42 is generally circular in shape. Body 42 is also annular and defines a bore 48 that is disposed about, and may be centered about, axis 20. Bore 48 is configured for alignment with bore 32 in object 14 and is configured to receive shank 18 of fastener 12. The diameter of bore 48 may be less than the diameter of head 22 of fastener 12 (or a nut surrounding shank 18 of fastener 12) such that a portion of body 42 is disposed axially between object 14 and head 22 (or a nut surrounding shank 18).

Arms 44 are provided to support fingers 46 and to prevent rotation of washer 16 upon assembly. Arms 44 extend radially outwardly from body 42. In the illustrated embodiment, washer 16 includes two arms 44 disposed on diametrically opposite sides of body 42. It should be understood, however, that the number of arms may vary. It should also be understood that if there is more than one arm 44, the arms 44 do not have to be diametrically opposed, but could be arranged in any pattern around body 42. Arms 44 may be shaped complementary to the shape of slots 40 of counterbore 36 and define an outer profile that follows the profile of slot 40 such that rotational movement of arms 44 and, therefore, washer 16 and fastener 12, is prevented or at least inhibited. Although the illustrated embodiment employs complementary shaped arms 44 and a counterbore 36 in object 14 to prevent or inhibit rotation of washer 16, lock washer 16 may assume other forms for this purpose. For example, washer 16 may be formed with tabs that wrap around or otherwise engage posts, shoulders, holes or another feature in object 14 to prevent or at least inhibit rotation of washer 16.

Fingers 46 are provided for selective engagement with fastener 12. In the illustrated embodiment, washer 16 includes two fingers 46 disposed on diametrically opposite sides of body 42. It should be understood, however, that the number of fingers 46 may vary. For example, six fingers 46 may be used if the head 22 or nut on fastener 12 is of the hex variety. It should also be understood that if there is more than one finger 46, the fingers 46 do not have be diametrically opposed, but could be arranged in any pattern about body 42. Fingers 46 may be shaped so as to fit within the outer profile of corresponding arms 44. Each finger 46 may include a radially extending section 50 defining one end 52 of finger 46, an axially extending section 54 defining an opposite end 56 of finger 46 and a curved transition section 58 joining sections 50, 54. Ends 52, 56 may be radially aligned with end 52 disposed radially outward of end 56. End 52 is coupled to body 42 and, in particular, may be coupled to an arm 44. End 56 is configured to selectively engage one of flats 28 on head 22 of fastener 12 or a nut disposed about fastener 12. End 52 may be pivotally coupled to arm 44 such that finger 46 is movable between a disengaged position wherein end 56 of finger 46 is configured for disengagement from a flat 28 in head 22 (or a nut) and an engaged position wherein end 56 of finger 46 is configured for engagement with at least a portion of flat 28 (e.g., shoulder 30). Finger 46 therefore provides a spring element within washer 16 and may be configured such that it is biased towards the engaged position. Finger 46 may also be configured such that transition section 58 is located in a different plane extending perpendicular to axis 20 relative to ends 52, 56 of finger 46 when finger 46 is in the engaged position.

Figure 7:
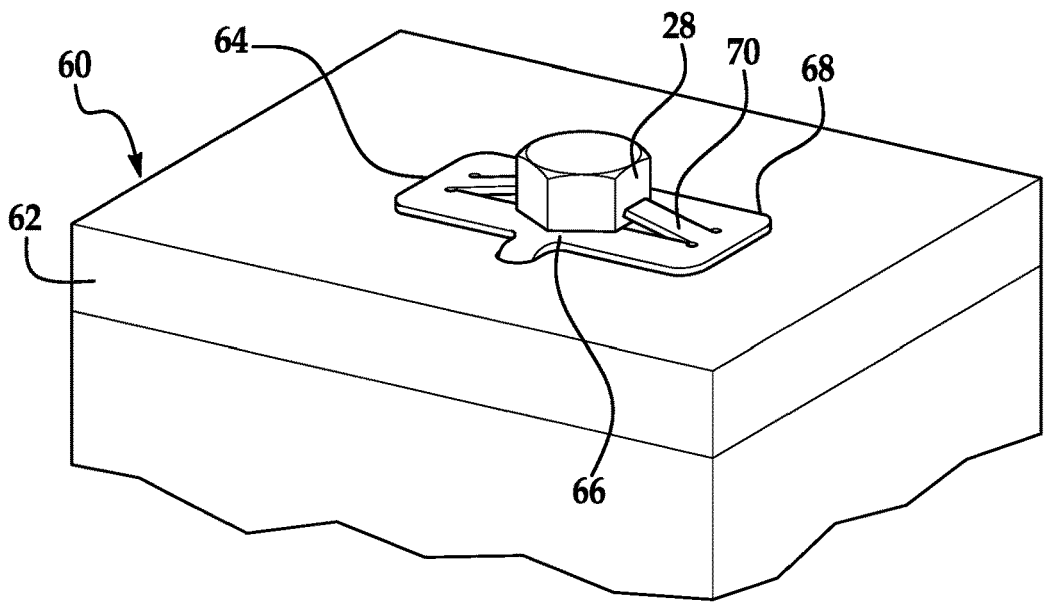
FIG. 7 is a perspective view of an assembly incorporating a lock washer for releasably locking a fastener to a component of the assembly in accordance with another embodiment of the present invention.
Figure 8:
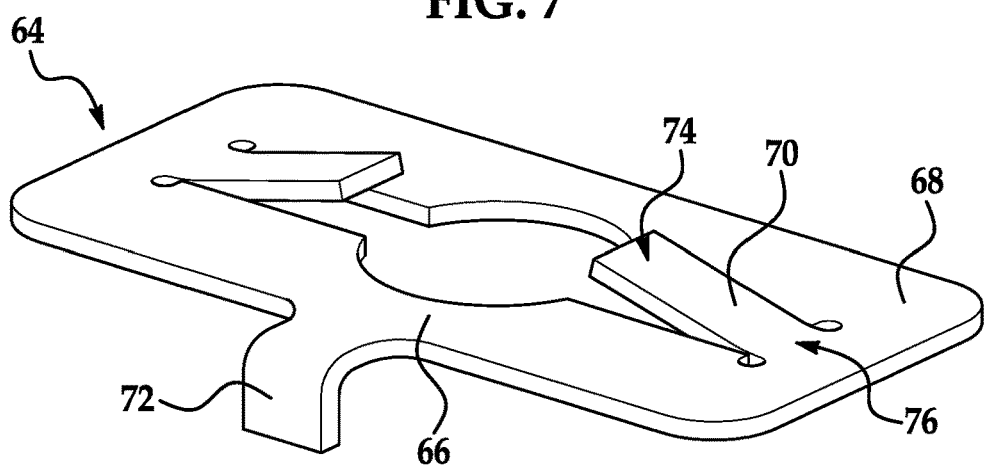
FIG. 8 is a perspective view of the lock washer of FIG. 7.

Referring now to FIG. 7, a portion of an assembly 60 is illustrated in which a fastener 12 is releasably locked to an object 62 within assembly 60 using a lock washer 64 in accordance with another embodiment of the present invention. Referring to FIG. 8, washer 64 may be similar to washer 16 and subsequent discussion of washer 64 has therefore been limited to differences relative to washer 16. Like washer 16, washer 64 may include a body 66, arms 68 and fingers 70. Unlike washer 16, body 66 and arms 68 are configured to rest on the surface of object 62 rather than in a counterbore. Accordingly, body 66 and arms 68 may assume a variety of shapes and profiles depending on the needs of the application. Any one or more of body 66 and arms 68 may define a tab 72 configured to engage a hole in object 62 as shown in FIG. 7 or to engage posts, shoulders or another feature in object 62 to prevent or at least inhibit rotation of washer 64. Unlike fingers 46 of washer 16, fingers 70 may be straight with one end 74 configured to engage a flat 28 on head 22 of fastener 12 or a nut disposed about the shank 18 of fastener 12 and another end 76 pivotally coupled to a corresponding arm 68 such that finger 70 is movable between a disengaged position wherein end 74 is configured for disengagement from flat 28 (and is disposed nearer to the surface of object 62) and an engaged position wherein end 74 of finger 70 is configured for engagement with at least a portion of flat 28 (and is disposed further from the surface of object 62).

Figure 9:
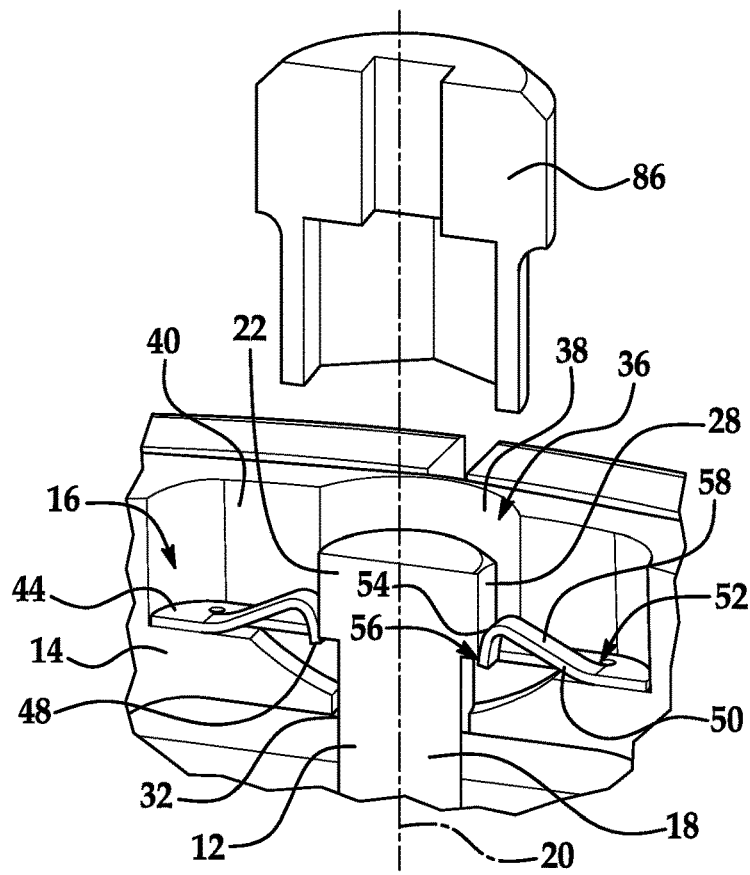
FIGS. 9-10 are cross-sectional views illustrating movement of the lock washer between positions of engagement and disengagement with the fastener in the assembly of FIGS. 1-2.
Figure 10:
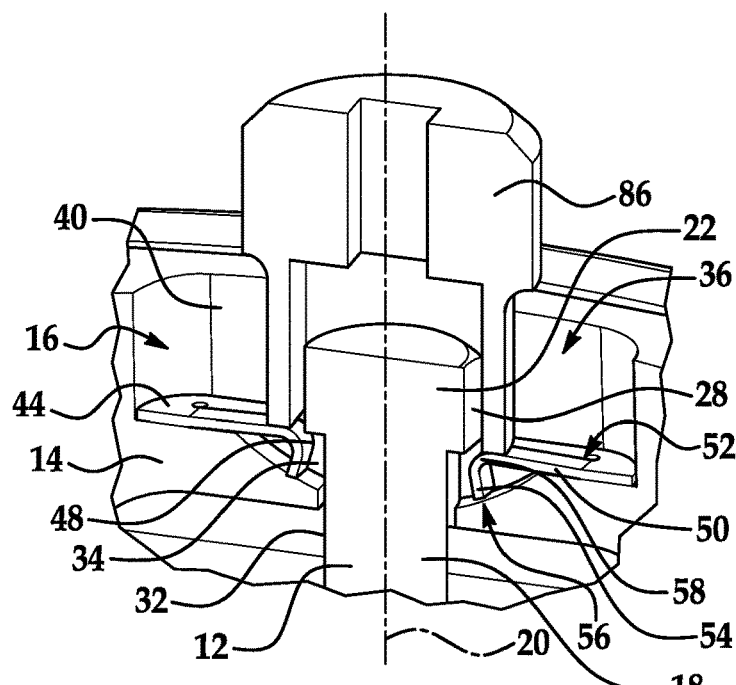
Figure 11:
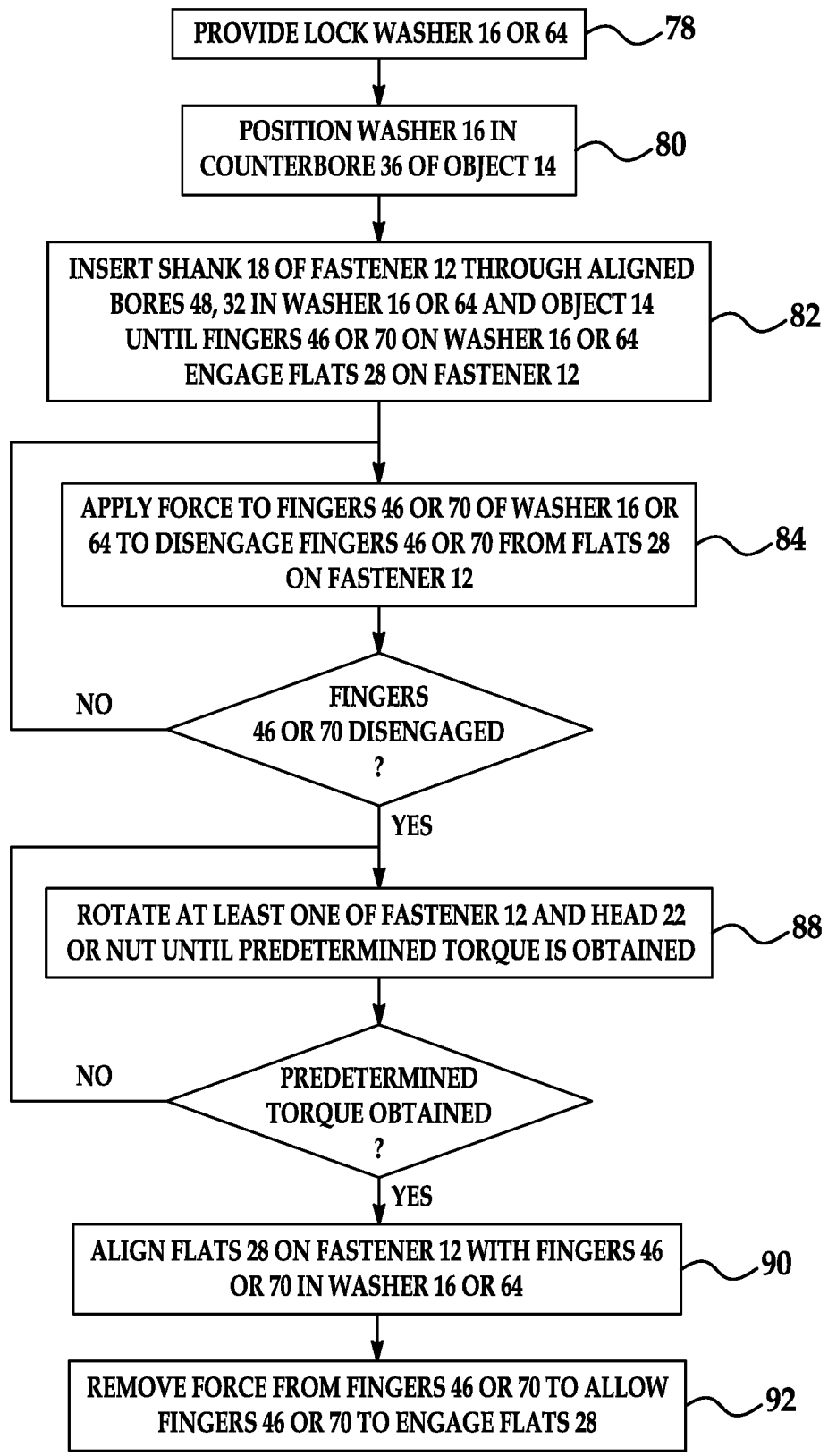
FIG. 11 is a flow chart illustrating a method for releasably locking a fastener to an object in accordance with one embodiment of the present invention.

Referring now to FIGS. 9-11, a method for releasably locking a fastener 12 to an object 14 will be described. Referring to FIG. 11, the method may begin with the step 78 of providing a lock washer 16 or 64 having a body 42 or 66 defining a bore 48 configured for alignment with bore 32 in object 14 with bores 32, 48 configured to receive shank 18 of fastener 12 and disposed about axis 20 along which fastener 12 extends. The washer 16 or 64 may further include one or more fingers 46 or 70 having one end 52 or 76 coupled to body 42 or 66 and another end 56 or 74 configured to selectively engage an axially extending flat 28 on either a head 22 of fastener 12 or a nut disposed about fastener 12. Each finger 46 or 70 is movable between a disengaged position wherein end 56 or 74 of finger 46 or 70 is configured for disengagement from flat 28 and an engaged position wherein end 56 or 74 of finger 46 or 70 is configured for engagement with flat 28. Finger 46 or 70 may be biased towards the engaged position.

In the case of washer 16, the method may continue with the step 80 of positioning washer 16 in a counterbore 36 in object 14 proximate bore 32. Washer 16 may be positioned such that body 42 is received within section 38 of counterbore 36 and arms 44 are received within slots 40 of counterbore 36 such that rotation of washer 16 is prevented or at least inhibited. In the case of washer 64, the method may continue with the step of coupling washer 64 to object 62 such as by inserting tab 72 into a corresponding hole in object 62.

The method may continue with the step 82 of inserting shank 18 of fastener 12 through bore 48 in washer 16 or 64 and into bore 32 in object 14. Once shank 18 is inserted to a predetermined depth, flats 28 on head 22 of fastener 12 may be engaged by ends 56 or 74 of fingers 46 or 70 inhibiting further rotation. Alternatively, a nut may be coupled to shank 18 and rotated about shank 18 until the nut reaches a position where ends 56 or 74 of fingers 46 or 70 engage flats on the nut and inhibit further rotation.

The method may continue with the step 84 of applying a force to fingers 46 or 70 to move fingers 46 or 70 to a disengaged position relative to flats 28. Referring to FIG. 9, in the absence of an external force, ends 56 or 74 of fingers 46 or 70 may engage corresponding flats 28 on head 22 of fastener 12 (or a nut) to inhibit rotation of fastener 12. In order to disengage lock washer 16 or 64, a tool such as a socket 86 may be moved in an axial direction over head 22 of fastener 12. Referring to FIG. 10, as socket 86 is moved axially, portions of socket 86 engage transition sections 58 of fingers 46 or ends 74 of fingers 70 and apply an axially directed force on sections 58 or ends 74. Fingers 46 or 70 pivot about ends 52 or 76 in response to the force applied to transition sections 58 or ends 74 by socket 86 causing ends 56 or 74 to disengage from flats 28. Ends 56 in washer 16 may be configured to be received within countersink 34 in object 14 when fingers 56 are in the disengaged position.

Referring again to FIG. 11, the method may continue with the steps 88, 90 of rotating at least one of shank 18 of fastener 12 and head 22 or a nut until a predetermined torque is obtained and aligning flats 28 with ends 56 of fingers 46 or ends 74 of fingers 70. Because fingers 46 and 70 are no longer engaged with flats 28, fastener 12 is again free to rotate. Fastener 12 may be rotated until a predetermined torque is obtained. Steps 88, 90 may be performed simultaneously if ends 56 of fingers 46 or ends 74 of fingers 70 and flats 28 are aligned when the predetermined torque is achieved. Alternatively, at least one of shank 18 of fastener 12 and head 22 or a nut may be rotated further to align the flats 28 with fingers 46 of washer 16 or fingers 70 of washer 64.

The method may continue with the step 92 of removing the force from fingers 46 or 70 to allow fingers 46 or 70 to move to the engaged position such that ends 56 of fingers 46 or ends 74 of fingers 70 engage flats 28. Movement of socket 86 in the opposite axial direction removes the force from transition sections 58 of fingers 46 or ends 74 of fingers 70 allowing fingers 46 or 70 to pivot at ends 52 or 76 and to return to the engaged position to which they are biased.

A lock washer 16 or 64 for releasably locking a fastener 12 to an object 14 or 62 and a method for releasably locking a fastener 12 to an object 14 or 62 in accordance with the present invention represent an improvement relative to conventional devices and methods intended to preventing fasteners from loosening. The inventive lock washer 16 or 64 does not require any structural changes to the fastener 12. The lock washer 16 or 64 also does not require multiple components and is relatively easy to install. Finally, the lock washer 16 or 64 can be disengaged from the fastener 12 to allow the fastener 12 to be rotated without an opposing force thereby allowing the washer 16 or 64 to exert a greater force on the fastener 12 when engaged than in conventional devices. The force that prevents fastener 12 from rotation is greater than the force required to release fingers 46 or 70 of washer 16 or 64.

While the invention has been shown and described with reference to one or more particular embodiments thereof, it will be understood by those of skill in the art that various changes and modifications can be made without departing from the spirit and scope of the invention.

What is claimed is:

1. A method for releasably locking a fastener to an object, comprising the steps of:
    providing a lock washer having
        a body defining a first bore configured for alignment with a second bore disposed in the object, said first and second bores configured to receive a shank of the fastener and disposed about a center axis along which said fastener extends; and,
        a first finger having a first end coupled to said body and a second end configured to selectively engage an axially extending first flat on a member of said fastener disposed about said shank of said fastener, said first finger movable between a disengaged position wherein said second end of said first finger is configured for disengagement from said first flat and an engaged position wherein said second end of said first finger is configured for engagement with said first flat, said first finger biased towards said engaged position;
    inserting the shank of the fastener through said first bore and into said second bore;
    applying a force to said first finger to move said first finger to said disengaged position;
    rotating at least one of the shank of the fastener and the member of the fastener until a predetermined torque is obtained;
    aligning the first flat with said second end of said first finger; and,
    removing said force to allow said first finger to move to said engaged position and said second end of said first finger to engage said first flat.

2. The method of claim 1, wherein said lock washer further comprises a second finger having a first end coupled to said body and a second end configured to selectively engage an axially extending second flat on said member of said fastener, said second finger movable between a disengaged position wherein said second end of said second finger is configured for disengagement from said second flat and an engaged position wherein said second end of said second finger is configured for engagement with said second flat, said second finger biased towards said engaged position, further comprising the steps of:
    applying said force to said second finger to move said second finger to said disengaged position;
    aligning the second flat with said second end of said second finger; and,
    removing said force to allow said second finger to move to said engaged position and said second end of said second finger to engage said second flat.

3. The method of claim 2, wherein said first and second fingers are disposed on diametrically opposite sides of said body.

4. The method of claim 1, wherein said first end of said first finger is pivotally coupled to said body.

5. The method of claim 1, wherein said first and second ends of said first finger are radially aligned and said first end of said first finger is disposed radially outwardly of said second end of said first finger.

6. The method of claim 1, wherein said lock washer further comprises a first arm extending radially outward from said body, said first end of said first finger coupled to said first arm and further comprising the step of positioning said lock washer in a counterbore in said object proximate said second bore, said first arm received within a radially extending slot in said counterbore to thereby inhibit rotation of said lock washer.

7. The method of claim 6, wherein said first finger is disposed within an outer profile of said first arm.

8. The method of claim 1, wherein said first finger comprises:
    a radially extending section defining said first end of said first finger;
    an axially extending section defining said second end of said first finger; and,
    a transition section joining said radially and axially extending sections.

9. The method of claim 8, wherein said transition section and said first end of said finger are disposed in different planes extending through said axis when said second end of said first finger is in the engaged position.

10. The method of claim 1, wherein said applying said force urges said second end of said first finger into a countersink in said object adjacent said second bore.

11. The method of claim 1, wherein said body and said first finger form a unitary structure.

* * * * *